United States Patent
Cho et al.

(10) Patent No.: US 9,001,936 B2
(45) Date of Patent: Apr. 7, 2015

(54) BUFFER MANAGEMENT DEVICE AND METHOD FOR HYBRID AUTOMATIC REPEAT REQUESTS IN A WIRELESS COMMUNICATION SYSTEM

(75) Inventors: Hyun-Sang Cho, Suwon-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 13/881,903

(22) PCT Filed: Oct. 17, 2011

(86) PCT No.: PCT/KR2011/007714
§ 371 (c)(1),
(2), (4) Date: Apr. 26, 2013

(87) PCT Pub. No.: WO2012/060559
PCT Pub. Date: May 10, 2012

(65) Prior Publication Data
US 2013/0215941 A1 Aug. 22, 2013

(30) Foreign Application Priority Data
Nov. 1, 2010 (KR) .................. 10-2010-0107444

(51) Int. Cl.
*H04L 27/06* (2006.01)
*H04L 1/00* (2006.01)
*H04L 1/18* (2006.01)

(52) U.S. Cl.
CPC ............ *H04L 1/0054* (2013.01); *H04L 1/1845* (2013.01)

(58) Field of Classification Search
CPC ............................. H04L 25/067; H04L 1/0045
USPC ........... 375/340, 222, 341; 370/242; 714/748, 714/752
See application file for complete search history.

(56) References Cited

U.S. PATENT DOCUMENTS

| | | | |
|---|---|---|---|
| 8,060,801 B2* | 11/2011 | Seol et al. | 714/748 |
| 2008/0002629 A1 | 1/2008 | Roh et al. | |
| 2008/0065944 A1 | 3/2008 | Seol et al. | |
| 2009/0059801 A1 | 3/2009 | Garrett et al. | |
| 2009/0086657 A1 | 4/2009 | Alpert et al. | |
| 2010/0195571 A1* | 8/2010 | Kuri et al. | 370/328 |
| 2011/0231725 A1* | 9/2011 | Gotman et al. | 714/748 |

FOREIGN PATENT DOCUMENTS

KR 10-2008-0001325 A 3/2008

* cited by examiner

*Primary Examiner* — Khai Tran
(74) *Attorney, Agent, or Firm* — Jefferson IP Law, LLP

(57) ABSTRACT

Effective management of a Hybrid-Automatic Repeat reQuest (HARQ) buffer in a wireless communication system is provided. A receiving terminal includes a first memory for storing Log Likelihood Ratio (LLR) values of at least one data block comprised in a received HARQ burst in a first memory, a channel decoder for decoding the at least one data block by using the LLR values, an error detection unit for detecting whether there are errors in the decoded at least one data block, and a second memory for storing at least one error-free data block in a decoded state among the data blocks in a second memory.

24 Claims, 4 Drawing Sheets

BUFFER MANAGEMENT DEVICE AND METHOD FOR HYBRID AUTOMATIC REPEAT REQUESTS IN A WIRELESS COMMUNICATION SYSTEM

BACKGROUND OF THE INVENTION

1. Field of the Invention

The present invention relates to a wireless communication system. In particular, the present invention relates to an effective buffer management apparatus and method for a Hybrid-Automatic Repeat reQuest (HARQ) scheme in a wireless communication system.

2. Description of the Related Art

A Hybrid Automatic Repeat reQuest (HARQ) scheme is employed to increase data transmission efficiency in a current wireless communication system and a next generation wireless communication system such as $3^{rd}$ Generation Partnership Project Long Term Evolution (3GPP LTE), Worldwide Interoperability for Microwave Access (WiMAX), etc. The HARQ scheme is proposed to correct a data error in a more rapid manner.

While the conventional Automatic Repeat reQuest (ARQ) scheme determines whether to retransmit reception data by determining an error of data received in a software manner, the HARQ scheme determines whether to perform retransmission by determining the error of the reception data in a hardware manner. Therefore, a system employing the HARQ scheme can rapidly detect an error of received data. In addition, higher reception performance can be obtained by combining Log Likelihood Ratio (LLR) values of retransmitted data and initially transmitted data.

In a next-generation communication system such as the aforementioned LTE and WiMAX, there is a tendency that a maximum data reception rate defined by a communication protocol for the HARQ scheme has gradually increased in recent years. Accordingly, a memory overhead is significantly great due to an increase in an HARQ reception rate when a modem is designed according to a protocol of the LTE, WiMAX, etc. Further, even if a memory of which a size is sufficient for the modem is ensured, it is difficult to design the modem when considering power consumption, a chip size, etc.

Accordingly, there is a need for a method of minimizing a required memory size and also minimizing power consumption by effectively using a memory when applying an HARQ scheme.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for decreasing a buffer size required for a Hybrid Automatic Repeat reQuest (HARQ) scheme in a wireless communication system.

Another aspect of the present invention is to provide an apparatus and method for handling an error situation caused by an insufficient buffer size when applying an HARQ scheme in a wireless communication system.

Another aspect of the present invention is to provide an apparatus and method for storing a decoding-failed block and a successfully decoded block in an HARQ buffer by distinguishing the blocks in a wireless communication system.

In accordance with a first aspect of the present invention, a receiving terminal in a wireless communication system is provided. The receiving terminal includes a first memory for storing Log Likelihood Ratio (LLR) values of at least one data block comprised in a received HARQ burst in a first memory, a channel decoder for decoding the at least one data block by using the LLR values, an error detection unit for detecting whether there are errors in the decoded at least one data block, and a second memory for storing at least one error-free data block in a decoded state among the data blocks in a second memory.

In accordance with a second aspect of the present invention, an operation method of a receiving terminal in a wireless communication system is provided. The method includes storing LLR values of at least one data block comprised in a received HARQ burst in a first memory, decoding the at least one data block by using the LLR values, detecting whether there are errors in the decoded at least one data block, and storing at least one error-free data block in a decoded state among the data blocks in a second memory.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
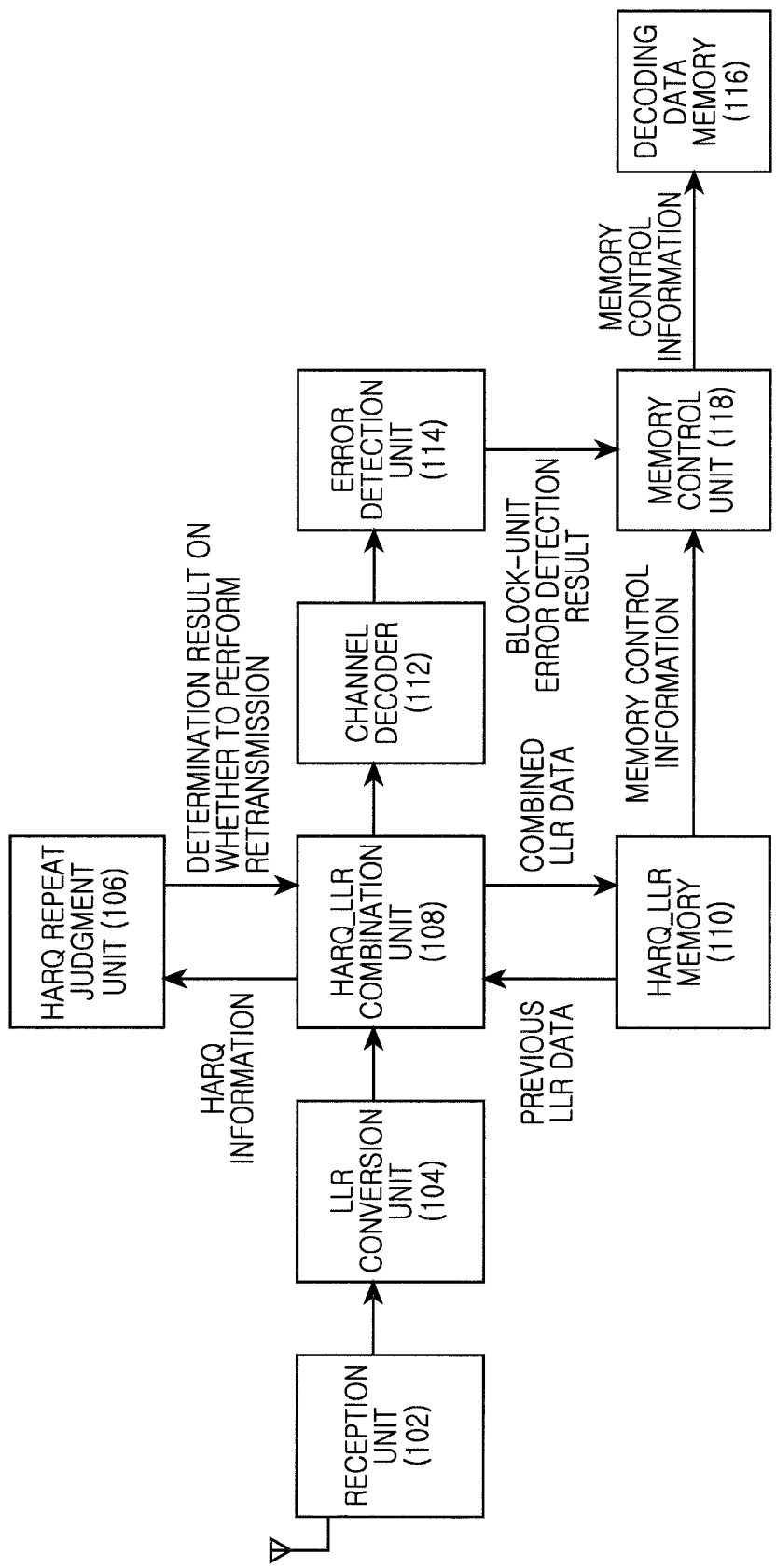
FIG. 1 is a block diagram of a receiving terminal in a wireless communication system according to an exemplary embodiment of the present invention.

Exemplary embodiments of the present invention will be described herein below with reference to the accompanying drawings. In the following description, well-known functions or constructions are not described in detail since they would obscure the invention in unnecessary detail.

The present invention described hereinafter relates to a technique for decreasing a buffer size required for a Hybrid Automatic Repeat reQuest (HARQ) scheme in a wireless communication system.

The present invention assumes that one HARQ burst consists of at least one data block in a system. Herein, the data block is a unit by which Forward Error Correction (FEC) is performed, and also is a unit by which a success/failure of decoding is determined. Therefore, the data block includes an error detection code, e.g., a Cyclic Redundancy Check (CRC) code. If a plurality of data blocks are included in one HARQ burst, data of the HARQ burst is delivered to a higher layer only when all of the data blocks are successfully decoded.

The present invention classifies a storage space in a HARQ buffer into an 'HARQ Log Likelihood Ratio (LLR) memory' and a 'decoding data memory'. The HARQ LLR memory stores LLR values of all data blocks included in a received HARQ burst. The decoding data memory includes only successfully decoded data blocks.

The present invention manages the HARQ LLR memory and the decoding data memory according to the following rules.

First, upon receiving an initially transmitted HARQ burst, a storage space required for the HARQ LLR memory and the decoding data memory is allocated. In this case, a size of the storage space of the HARQ LLR memory is determined according to the number of data blocks included in the HARQ burst, a size of the data block, a channel coding rate, and the number of bits of an LLR value. Further, a size of the storage space of the decoding data memory is determined according to the number of data blocks and the size of the data block.

Second, all of the initially transmitted HARQ bursts are stored in the HARQ LLR memory.

Third, the data storage space is managed in a unit of a block. That is, the storage space is managed in a unit of a block with a pre-defined size to increase efficiency of memory management, and the number of memory blocks allocated to each data block of one HARQ burst is an integer number.

Fourth, if a CRC result of each data block of the HARQ burst shows no error, a space occupied by a corresponding block in the HARQ LLR memory is released. Otherwise, if the CRC result shows an error, the data block is directly stored in the HARQ LLR memory.

Fifth, if the CRC result shows no error, the data block is stored in the decoding data memory. However, if the HARQ burst includes a plurality of data blocks, each data block is stored by considering a location in a burst since the decoding data memory also takes a role of sorting one piece of data.

Sixth, if all of the HARQ bursts are stored in the decoding data memory, the burst is delivered to a higher layer, and a corresponding storage space is flushed from the decoding data memory.

When the HARQ buffer is managed based on the aforementioned rules, a size of the HARQ LLR memory may be decreased according to an initial transmission failure probability managed by a system. For example, if the initial transmission failure probability is 15%, only 15 HARQ data blocks out of 100 HARQ data blocks are required to be stored in the HARQ LLR memory in a format of an LLR value. That is, the lower the initial transmission failure probability, the smaller the required size of the HARQ LLR memory. On the other hand, a data block which is successfully decoded in initial transmission is stored in the decoding data memory. In this case, since the successfully decoded data block is stored in a decoded state, the decoding data memory has a significantly smaller size than the HARQ LLR memory. For example, the HARQ LLR memory for storing the same sized data block and the decoding data memory have a size relation as expressed by Equation (1) bellow.

$$SIZE_{decoding\_memory} = SIZE_{LLR\_memory} / (SIZE_{LLR\_bit} \times RATE_{channel\_coding}) \quad (1)$$

In Equation (1) above, $SIZE_{decoding\_memory}$ denotes the size of the decoding data memory, $SIZE_{LLR\_memory}$ denotes the size of the HARQ LLR memory, $SIZE_{LLR\_bit}$ denotes the number of bits of an LLR value indicating one bit of data, and $RATE_{channel\_coding}$ denotes a coding rate of channel coding. According to Equation (1) above, if the number of bits of the LLR value is 4 and the coding rate of the channel coding is 3 for example, the size of the decoding data memory is $\frac{1}{12}$ of the size of the HARQ LLR memory.

As described above, the HARQ LLR memory is implemented such that only a decoding-failed data block is stored whereas a successfully decoded data block is stored in an additional decoding data memory, thereby decreasing an overall HARQ buffer size. However, since the size of the HARQ LLR memory is determined by considering the initial transmission failure possibility, a memory overflow may occur when a channel state deteriorates rapidly or changes significantly. Therefore, there is a need for a method of handling the memory overflow.

The memory overflow may occur due to various factors. For example, in a first case, the memory overflow occurs instantaneously since data to be stored in the memory is increased due to a rapid deterioration of channel quality, and in a second case, HARQ data is lost due to a channel deterioration, and a Base Station (BS) discards an ARQ Channel IDentifier (ACID) of a corresponding HARQ channel and continuously transmits data with another ACID. In the second exemplary case, HARQ data for the discarded ACID persistently occupies a memory space, and the space cannot be flushed if the BS does not allocate the ACID again. An overflow occurs when such space is accumulated.

In addition to the aforementioned situation in which the overflow occurs, a situation in which another HARQ burst is initially transmitted in a transmitting terminal by using an ACID stored in an HARQ LLR memory of a receiving terminal must be taken into account for memory management. That is, this is a situation in which a new HARQ burst is initially transmitted by using the same ACID before a process for the ACID is complete in the receiving terminal. This situation may occur when information is not smoothly delivered between the transmitting terminal and the receiving terminal. Although there is no problem in the HARQ data itself since it is not the situation in which the overflow occurs, memory management is smoothly performed only when a pre-allocated memory is released and a new storage space is allocated.

The aforementioned error situation can be handled as follows.

If the channel quality deteriorates rapidly and thus the overflow occurs instantaneously in the HARQ LLR memory, the receiving terminal searches for an ACID stored for the longest period of time among ACIDs of stored data, removes a decoding data memory storage space and an HARQ LLR memory storage space allocated for the ACID stored for the longest period of time, and thereafter confirms whether the decoding data memory storage space and the HQRA LLR memory storage space of a newly transmitted HARQ are sufficient. If the storage space is sufficient, the receiving terminal sets the HARQ LLR memory and decoding data memory storage spaces. Otherwise, if the storage space is insufficient, the storage space of the decoding data memory and the storage space of the HARQ LLR memory allocated to the ACID stored for the longest period of time are searched for again and are then removed.

If the process for HARQ data is not complete and thus an overflow occurs since the HARQ data still exists, the receiving terminal searches for and removes the storage space allocated to the oldest ACID through a process similar to that described above.

If new HARQ data is initially transmitted with the same ACID before a process for a pre-allocated ACID is complete, the receiving terminal confirms and releases the storage space of the decoding data memory and the storage space of the HARQ LLR memory of the data allocated to the previous ACID, and thereafter ensures a storage space for HARQ data of a newly transmitted ACID.

Hereinafter, the present invention describes a structure and operation of a receiving terminal for managing the aforementioned HARQ buffer in detail with reference to the accompanying drawings.

FIG. 1 is a block diagram of a receiving terminal in a wireless communication system according to an exemplary embodiment of the present invention.

Referring to FIG. 1, the receiving terminal includes a reception unit 102, an LLR conversion unit 104, an HARQ repeat judgment unit 106, an HARQ_LLR combination unit 108, an HARQ_LLR memory 110, a channel decoder 112, an error detection unit 114, a decoding data memory 116, and a memory control unit 118.

The reception unit 102 converts a signal received through an antenna on the basis of a unit by which a signal can be processed according to a physical layer protocol of a system. For example, the reception unit 102 converts a signal of a Radio Frequency (RF) band into a baseband signal, and then amplifies and filters the signal. For example, in case of an Orthogonal Frequency Division Multiple Access (OFDMA)-based system, the reception unit 102 splits the baseband signal in a unit of an OFDMA symbol, and restores signals mapped to subcarriers by using a Fast Fourier Transform (FFT) operation.

The LLR conversion unit 104 generates LLR values of a received HARQ burst. In other words, the LLR conversion unit 104 converts data subjected to channel compensation into an LLR value by using a channel estimation result and a received signal value. In this case, the number of bits of an LLR value per one bit of data is preferably determined by considering how much the channel estimation result is considered and how much system performance deteriorates. That is, the LLR conversion unit 104 generates the LLR values consisting of a pre-defined number of bits.

The HARQ repeat judgment unit 106 determines whether the received HARQ burst is initially transmitted or retransmitted. For this, the HARQ repeat judgment unit 106 receives HARQ information from the HARQ_LLR combination unit 108. For example, the HARQ information may include an ACID, a SubPacket IDentifier (SPID), an ARQ Identifier Sequence Number (AISN), etc. Further, the HARQ repeat judgment unit 106 notifies to the HARQ_LLR combination unit 108 whether it is retransmission or initial transmission.

The HARQ_LLR combination unit 108 combines LLR values of an initially transmitted HARQ burst and LLR values of a retransmitted HARQ burst. In this case, the HARQ_LLR combination unit 108 combines the LLR values by using an Incremental Redundancy (IR) mechanism or a Chase Combining (CC) mechanism. When using the IR mechanism, the retransmitted HARQ burst consists of parity bits, and thus the HARQ_LLR combination unit 108 adds the LLR values of the retransmitted HARQ burst to the LLR values of the initially transmitted HARQ burst. When using the CC mechanisms, the retransmitted HARQ burst consists of the same data as the initially transmitted HARQ burst, and thus the HARQ_LLR combination unit 108 adds the LLR values of the initially transmitted HARA burst and the LLR values of the retransmitted HARQ burst by applying a determined weight. That is, the HARQ_LLR combination unit 108 receives the LLR values of the initially transmitted HARQ burst from the HARQ_LLR memory 110, combines the LLR values of the initially transmitted HARQ burst with the LLR values of the retransmitted HARQ burst, and thereafter provides the combined LLR values to the channel decoder 112.

The HARQ_LLR memory 110 stores LLR values for respective data blocks of the HARQ burst provided from the HARQ_LLR combination unit 108. The HARQ_LLR memory 110 sets a storage space for the HARQ burst under the control of the memory control unit 118. In addition, the HARQ_LLR memory 110 releases the storage space for the HARQ burst under the control of the memory control unit 118. In this case, the storage space is managed, i.e., set and released, in a unit of a memory block with a pre-defined size. In addition, upon receiving the retransmitted HARQ burst, the HARQ_LLR memory 110 provides the HARQ_LLR combination unit 108 with the LLR values of the initially transmitted or previously transmitted HARQ burst corresponding to the corresponding HARQ burst.

The channel decoder 112 performs channel decoding by using LLR values provided from the HARQ_LLR combination unit 108. The error detection unit 114 receives a decoded data block from the channel decoder 112 and determines whether the data block is successfully decoded. For example, the error detection unit 114 uses CRC to determine whether there is an error. In addition, the error detection unit 114 notifies to the memory control unit 118 whether there is an error for each data block.

The decoding data memory 116 sets a storage space for the HARQ burst under the control of the memory control unit 118, and stores successfully decoded data provided from the error detection unit 114 in a decoded state. In this case, in order to sort the data blocks, the decoding data memory 116 determines a location at which the successfully decoded data block is stored by considering a location in the HARQ burst. In addition, the decoding data memory 116 releases the storage space for the HARQ burst under the control of the memory control unit 118. In this case, the storage space is managed, that is, set and released, in a unit of a memory block with a pre-defined size. In addition, when all data blocks in the HARQ burst are successfully decoded, the decoding data memory 116 delivers data of the HARQ burst to a higher layer.

The memory control unit 118 controls the HARQ_LLR memory 110 and the decoding data memory 116 according to reception of the HARQ burst, an error checking result, etc. For example, if the HARQ burst is initially transmitted when the HARQ burst is received, the memory control unit 118 instructs each of the HARQ_LLR memory 110 and the decoding data memory 116 to set a storage space. Otherwise, if the HARQ burst is retransmitted, the memory control unit 118 instructs the HARQ_LLR memory 110 to set a storage space. Further, if at least one data block of the HARQ burst is successfully decoded, the memory control unit 118 instructs the HARQ_LLR memory 110 to delete LLR values of the data block, and instructs the decoding data memory 116 to store data of the data block. In addition, if all data blocks of the HARQ burst are successfully decoded, the memory control unit 118 instructs the decoding data memory 116 to deliver the all data blocks of the HARQ burst to a higher layer and to release the storage space.

In addition, the memory control unit 118 manages the storage space of the HARQ_LLR memory 110 and the decoding data memory 116 to handle an error situation such as an overflow or the like. First, if the overflow occurs, the memory control unit 118 searches for and releases a storage space allocated to the oldest ACID in the HARQ_LLR memory 110 and the decoding data memory 116, and thereafter confirms whether the storage space is sufficient. If the storage space is insufficient, the memory control unit 118 repetitively searches for and releases the storage space allocated to the oldest ACID until a sufficient storage space is ensured. Next, upon receiving a new HARQ burst to which an ACID currently in use is allocated, the memory control unit 118 releases the storage space currently allocated to the ACID, and sets a storage space for the new HARQ burst to the HARQ_LLR memory 110 and the decoding data memory 116.

The structure of FIG. 1 can be implemented inside a modem chip, except for the reception unit 102. That is, the HARQ_LLR memory 110 and the decoding data memory 116 are included in a storage means located inside one modem chip. However, according to another exemplary embodiment, one of the HARQ_LLR memory 110 and the decoding data memory 116 can be implemented outside the modem chip. However, when considering a memory access rate or the like, the HARQ_LLR memory 110 and the decoding data memory 116 are preferably implemented inside one modem chip. In this case, a size ratio of the HARQ_LLR memory 110 and the decoding data memory 116 is determined according to an initial transmission failure ratio of a system.

Although not shown in FIG. 1, the receiving terminal may further include a signaling processor to process signaling with respect to a transmitting terminal. If the error checking result of the error detection unit 114 shows that decoding of at least one data block fails, the signaling processor transmits to the transmitting terminal a signal for requesting retransmission of a corresponding HARQ burst. In addition, if all of HARQ data blocks are successfully decoded, the signaling processor transmits to the transmitting terminal a signal for reporting successful reception of the corresponding HARQ burst.

Figure 2:
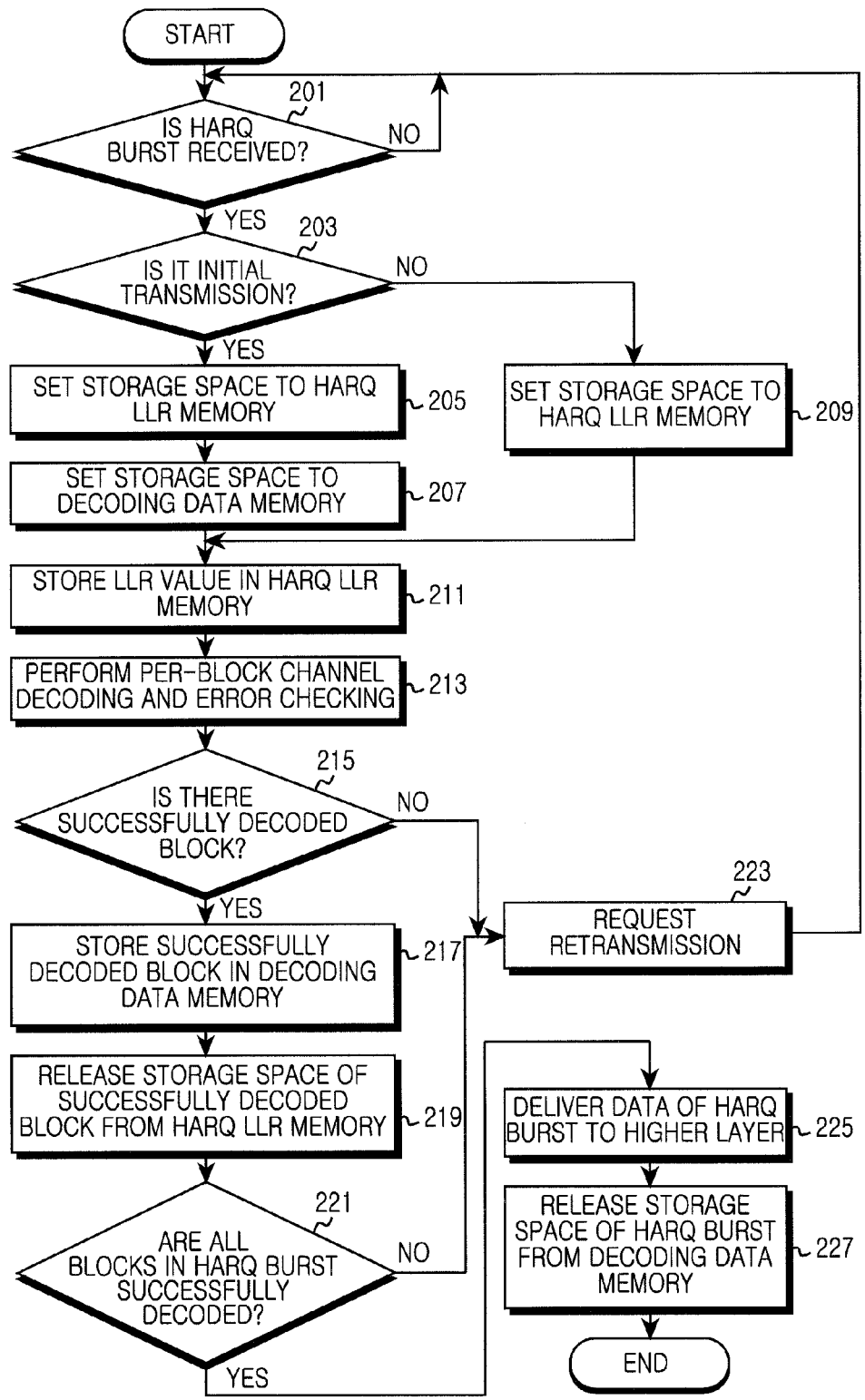
FIG. 2 is a flowchart illustrating a Hybrid-Automatic Repeat reQuest (HARQ) buffer management process of a receiving terminal in a wireless communication system according to an exemplary embodiment of the present invention.

FIG. 2 is a flowchart illustrating an HARQ buffer management process of a receiving terminal in a wireless communication system according to an exemplary embodiment of the present invention.

Referring to FIG. 2, the receiving terminal confirms whether an HARQ burst is received in step 201. If the HARQ burst is received, proceeding to step 203, the receiving terminal confirms whether it is initial transmission of the HARQ burst.

If it is initial transmission of the HARQ burst, proceeding to step 205, the receiving terminal sets a storage space to an HARQ LLR memory. The HARQ LLR memory stores LLR values for respective data blocks of the received HARQ burst, and deletes LLR values of the successfully decoded data block. In this case, the storage space is set in a unit of a memory block with a pre-defined size, and the number of memory blocks determined in step 205 is determined according to the number of data blocks included in the HARQ burst, a size of the data block, a channel coding rate, and the number of bits of an LLR value.

In step 207, the receiving terminal sets a storage space to the decoding data memory. The decoding data memory stores data of a successfully decoded data block among data blocks of the received HARQ burst. In this case, the storage space is set in a unit of a memory block with a pre-defined size, and the number of memory blocks determined in step 207 is determined according to the number of data blocks included in the HARQ burst and a size of the data block.

If it is not initial transmission of the HARQ burst in step 203, proceeding to step 209, the receiving terminal sets a storage space to the HARQ LLR memory. The HARQ LLR memory stores LLR values for respective data blocks of the received HARQ burst, and deletes LLR values of the successfully decoded data block. In this case, the storage space is set in a unit of a memory block with a pre-defined size, and the number of memory blocks determined in step 205 is determined according to the number of data blocks included in the HARQ burst, a size of the data block, a channel coding rate, and the number of bits of an LLR value.

After the storage space is set in the decoding data memory in step 207 or the storage space is set in the HARQ LLR memory in step 209, proceeding to step 211, the receiving terminal stores LLR values of respective data blocks of the HARQ burst in the HARQ LLR memory. That is, the receiving terminal generates the LLR values for the respective data blocks of the HARQ burst, and thereafter stores the LLR values in the storage space set in step 205 or step 209.

In step S213, the receiving terminal performs channel decoding and error checking for each data block. That is, the HARQ burst includes at least one data block, and each data block is a unit by which channel coding and error checking are performed. For example, the receiving terminal checks for an error by using CRC. If the HARQ burst is retransmitted in this case, the receiving terminal combines LLR values of a previously received HARQ burst and LLR values of a currently received HARQ burst, and thereafter performs channel decoding by using the combined LLR values.

In step S215, the receiving terminal confirms whether there is a successfully decoded data block. In other words, the receiving terminal determines whether one data block is successfully decoded. If there is no data block successfully decoded, the procedure proceeds to step 223.

Otherwise, if at least one data block is successfully decoded, proceeding to step 217, the receiving terminal stores the at least one data block successfully decoded into the decoding data memory. In this case, the at least one data block successfully decoded is stored in a state of decoded data. In this case, the receiving terminal determines a location at which the at least one data block successfully decoded is stored by considering a location in the HARQ burst.

After storing the successfully decoded at least one data block into the decoding data memory, proceeding to step 219, the receiving terminal deletes the successfully decoded at least one data block from the HARQ LLR memory, and releases a corresponding storage space.

In step S221, the receiving terminal confirms whether all data blocks in the HARQ burst are successfully decoded. That is, the receiving terminal determines whether the HARQ burst is successfully received.

If all of the data blocks are not successfully decoded, that is, if there is at least one decoding-failed data block, proceeding to step 223, the receiving terminal requests a transmitting terminal to retransmit the HARQ burst. For example, the receiving terminal transmits to the transmitting terminal a signal (e.g., Non-ACKnowledge (NACK)) for requesting retransmission.

Otherwise, if all of the data blocks are not successfully decoded, proceeding to step 225, the receiving terminal delivers data of the HARQ burst to a higher layer. That is, the receiving terminal configures the data of the HARQ burst by gathering the successfully decoded data blocks, and delivers the data of the HARQ burst to the higher layer, e.g., an L2 layer or a low-Media Access Control (MAC) layer.

In step 227, the receiving terminal deletes the successfully decoded data blocks of the HARQ burst from the decoding data memory, and releases a storage space set for the HARQ burst.

Figure 3:
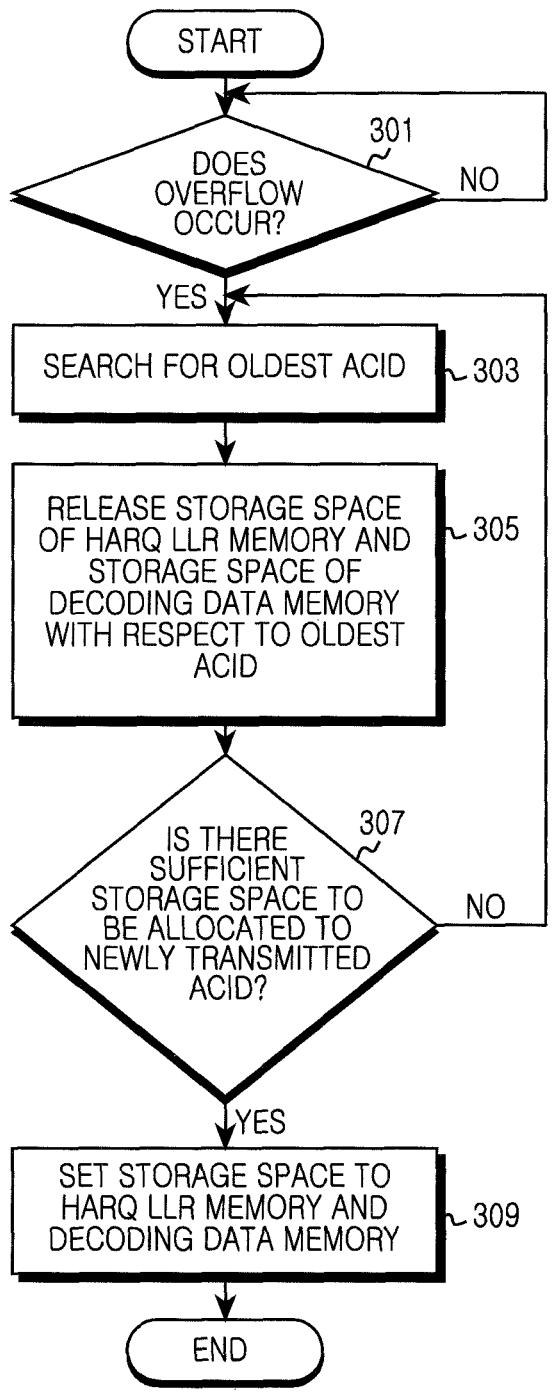
FIG. 3 is a flowchart illustrating an HARQ buffer management process of a receiving terminal when an overflow occurs in a wireless communication system according to an exemplary embodiment of the present invention.

FIG. 3 is a flowchart illustrating an HARQ buffer management process of a receiving terminal when an overflow occurs in a wireless communication system according to an exemplary embodiment of the present invention.

Referring to FIG. 3, the receiving terminal determines whether an overflow of an HARQ buffer occurs in step 301. The overflow is a phenomenon in which a storage space of the HARQ buffer is insufficient, that is, in which there is data to be stored but an available storage space is less than a size of the data to be stored. For example, the overflow may occur in a case where data to be stored in the memory is increased in size due to a rapid deterioration of channel quality or a case in which HARQ data is lost due to a channel deterioration and a BS discards an ACID of a corresponding HARQ channel and continuously transmits data with another ACID. That is, the receiving terminal can determine whether the overflow occurs when a new HARQ burst is received.

At the occurrence of the overflow, proceeding to step 303, the receiving terminal searches for the oldest ACID. The ACID is identification information for identifying an HARQ channel. An initially transmitted HARQ burst and a retransmitted HARQ burst for one original packet use the same ACID. That is, the oldest ACID implies an ACID of the first HARQ burst initially transmitted among HARQ bursts stored in a current HARQ buffer. In other words, the oldest ACID implies an ACID of an HARQ burst stored for the longest period of time.

In step 305, the receiving terminal releases a storage space of a decoding data memory and a storage space of an HARQ LLR memory with respect to the oldest ACID. That is, the receiving terminal discards the HARQ burst stored for the longest period of time.

After releasing the storage space for the oldest ACID, proceeding to step 307, the receiving terminal determines whether there is a sufficient storage space to be allocated to a newly transmitted ACID. In other words, the receiving terminal determines whether there is a sufficient storage space to be allocated for a new HARQ burst. That is, the receiving terminal compares a size of a storage space not allocated in the HARQ LLR memory and LLR values of the new HARQ burst, and thereafter determines whether the non-allocated storage space is greater than or equal to the LLR values. If the storage space to be allocated to the newly transmitted ACID is insufficient, the procedure returns to step 303.

Otherwise, if there is a sufficient storage space to be allocated to the newly transmitted ACID, proceeding to step 309, the receiving terminal sets the storage space to be allocated to the newly transmitted ACID in the HARQ LLR memory and the decoding data memory. In other words, the receiving terminal sets the storage space for the new HARQ in the HARQ LLR memory and the decoding data memory.

Figure 4:
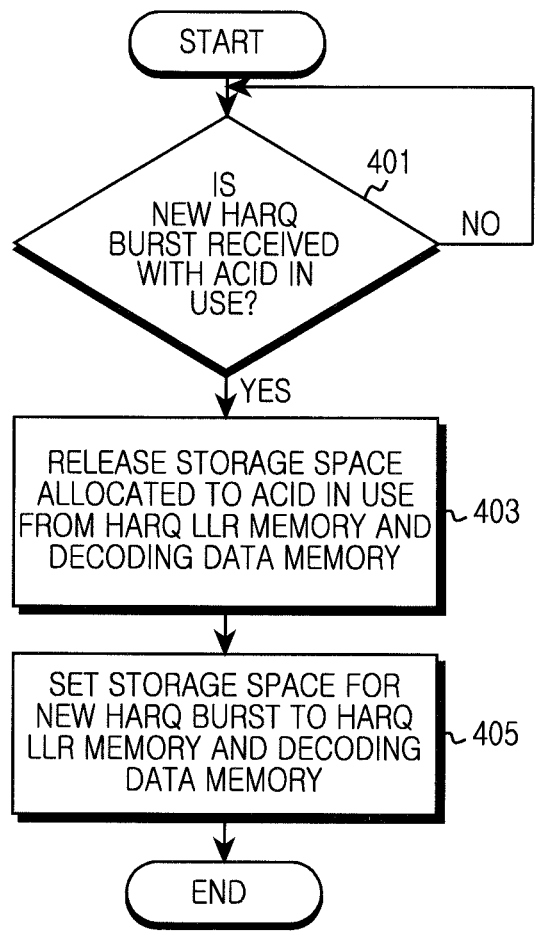
FIG. 4 is a flowchart illustrating an HARQ buffer management process of a receiving terminal when an overlapping an ARQ Channel IDentifier (ACID) occurs in a wireless communication system according to an exemplary embodiment of the present invention.

FIG. 4 is a flowchart illustrating an HARQ buffer management process of a receiving terminal when an overlapping ACID occurs in a wireless communication system according to an exemplary embodiment of the present invention.

Referring to FIG. 4, the receiving terminal determines whether a new HARQ burst to which an ACID currently in use is allocated is received in step 401. The ACID is identification information for identifying an HARQ channel. An initially transmitted HARQ burst and a retransmitted HARQ burst for one original packet use the same ACID. Therefore, in principle, the HARQ burst with the same ACID must not be received before a process for the HARQ burst of the ACID currently in use is complete. However, a situation in which a new HARQ burst is received with an ACID currently in use may occur when information on an HARQ procedure between a transmitting terminal and the receiving terminal is not smoothly delivered due to a channel deterioration.

If the new HARQ burst is received with the ACID currently in use, proceeding to step 403, the receiving terminal confirms a storage space allocated to the ACID currently in use, and releases the storage space allocated to the ACID currently in use from the HARQ LLR memory and the decoding data memory. That is, the receiving terminal recognizes that the HARQ burst with the ACID currently in use is deleted from the transmitting terminal in a state where the process of the HARQ burst is not complete, and discards the HARQ burst with the ACID currently in use.

In step 405, the receiving terminal allocates a storage space for the HARQ burst received in step 401. In other words, the receiving terminal sets a storage space for the new HARQ burst in the HARQ LLR memory and the decoding data memory.

According to exemplary embodiments of the present invention, a wireless communication system distinguishes an HARQ buffer and stores a successfully decoded data block in a decoded state, thereby being able to decrease a size of the HARQ buffer.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An operation method of a receiving terminal in a wireless communication system, the method comprising:
    storing Log Likelihood Ratio (LLR) values of at least one data block comprised in a received Hybrid Automatic Repeat reQuest (HARQ) burst in a first memory;
    decoding the at least one data block by using the LLR values; and
    storing at least one error-free data block in a decoded state in a second memory.

2. The method of claim 1, further comprising:
    setting a storage space for the HARQ bursts in the first memory upon receiving an initially transmitted HARQ burst or upon receiving a retransmitted HARQ burst.

3. The method of claim 1, further comprising:
    setting a storage space for the HARQ bursts in the second memory upon receiving an initially transmitted HARQ burst.

4. The method of claim 1, further comprising: detecting whether there are errors in the decoded at least one data block; and
    deleting the LLR values of the at least one error-free data block from the first memory.

5. The method of claim 1, further comprising:
    if all of the at least one data block of the HARQ burst are stored in the second memory, delivering the all of the at least one data block to a higher layer; and
    deleting the all of the at least one data block from the second memory.

6. The method of claim 1, wherein the storing of the at least one error-free data block in the decoded state among the data blocks in the second memory comprises determining a location at which the at least one error-free data block is stored by considering a location in the HARQ burst of the at least one error-free data block.

7. The method of claim 1, wherein the first memory and the second memory set and release a storage space in a unit of a memory block with a pre-defined size.

8. The method of claim 1, wherein a size ratio of the first memory and the second memory is determined according to an initial transmission failure ratio.

9. The method of claim 1, further comprising:
    generating LLR values of a received HARQ burst; and
    combining LLR values of an initially transmitted HARQ burst and LLR values of a retransmitted HARQ burst.

10. The method of claim 1, further comprising:
    if an overflow occurs in the first memory, releasing a storage space allocated to the oldest ACID from the first memory and the second memory.

11. The method of claim 1, further comprising:
upon receiving a new HARQ burst to which an ACID currently in use is allocated, releasing a storage space currently allocated to the ACID; and
setting a storage space for the new HARQ burst in the first memory and the second memory.

12. The method of claim 1, wherein the first memory and the second memory are located inside the same modem chip.

13. An apparatus of a receiving terminal in a wireless communication system, the apparatus comprising:
a first memory configured to store Log Likelihood Ratio (LLR) values of at least one data block comprised in a received Hybrid Automatic Repeat reQuest (HARQ) burst in a first memory;
a decoder configured to decode the at least one data block by using the LLR values; and
a second memory configured to store at least one error-free data block in a decoded state in a second memory.

14. The apparatus of claim 13, wherein the first memory is further configured to set a storage space for the HARQ bursts in the first memory upon receiving an initially transmitted HARQ burst or upon receiving a retransmitted HARQ burst.

15. The apparatus of claim 13, wherein the second memory is further configured to set a storage space for the HARQ bursts in the second memory upon receiving an initially transmitted HARQ burst.

16. The apparatus of claim 13, further comprising:
an error detection unit configured to detect whether there are errors in the decoded at least one data block,
wherein the first memory, after detecting of whether there are errors, is further configured to delete the LLR values of the at least one error-free data block from the first memory.

17. The apparatus of claim 13, wherein the second memory, if all of the at least one data block of the HARQ burst are stored in the second memory, is further configured to deliver the all of the at least one data block to a higher layer, and, to delete the all of the at least one data block from the second memory.

18. The apparatus of claim 13, wherein the second memory is further configured to determine a location at which the at least one error-free data block is stored by considering a location in the HARQ burst of the at least one error-free data block.

19. The apparatus of claim 13, wherein the first memory and the second memory are further configured to set and release a storage space in a unit of a memory block with a pre-defined size.

20. The apparatus of claim 13, wherein a size ratio of the first memory and the second memory is determined according to an initial transmission failure ratio.

21. The apparatus of claim 13, further comprising:
an LLR conversion unit configured to generate LLR values of a received HARQ burst; and
an LLR combination unit configured to combine LLR values of an initially transmitted HARQ burst and LLR values of a retransmitted HARQ burst.

22. The apparatus of claim 13, further comprising:
a memory control unit configured to, if an overflow occurs in the first memory, release a storage space allocated to the oldest ACID from the first memory and the second memory.

23. The apparatus of claim 13, further comprising:
a memory control unit configured to, upon receiving a new HARQ burst to which an ACID currently in use is allocated, release a storage space currently allocated to the ACID, and, to set a storage space for the new HARQ burst in the first memory and the second memory.

24. The apparatus of claim 13, wherein the first memory and the second memory are located inside the same modem chip.

* * * * *